United States Patent Office 3,401,131
Patented Sept. 10, 1968

3,401,131
HOT MELT ADHESIVES CONTAINING POLY-DIMETHYL ALPHA-METHYL STYRENE RESIN
Gerald D. Mase, Homewood, Ill., and Paul O. Powers, North Plainfield, N.J., assignors to Standard Oil Company, Chicago, Ill., a corporation of Indiana
No Drawing. Filed Sept. 19, 1966, Ser. No. 580,197
4 Claims. (Cl. 260—28.5)

ABSTRACT OF THE DISCLOSURE

Hot melt adhesives and hot melt coatings are made from a combination of paraffin wax, an ethylene-vinyl acetate copolymer and a polydimethyl alpha-methyl styrene resin.

---

This invention pertains to a thermo-plastic resin made from dimethyl alpha-methyl styrene and a novel, hot melt, adhesive composition made from such resin.

More particularly, our invention relates to hot melt adhesives and hot melt coatings of the sort made by combining paraffin wax, ethylene-vinyl acetate copolymers, and a thermo-plastic resin. Suitable thermo-plastic resins which contribute hot tack property to hot melt formulations are known to the art, such as the alpha-methyl styrene/vinyl toluene copolymers described in U.S. Patent 3,245,931. Among other materials which have been used to contribute hot tack property to hot melt adhesive and coating formulations are rosen derivatives and beta-pinene-type resins, though these natural materials have been substantially displaced by the recently developed synthetic copolymers.

We have found that a resin prepared from dimethyl alpha-methyl styrene can be used in hot melt formulations as a replacement for resins known to the art and that such resins provide enhanced processability during compounding. This is evidenced by the good compatibility of dimethyl alpha-methyl styrene resins with the other components of hot melt formulations and the good setting of such resins, which is probably a function of their compatibility. Further, our novel resins have a lower viscosity at processing temperatures than many of the alternative compounds heretofore known to this art and often have an improved color or, at the least, a reduced opacity.

The resins suitable for the practice of our invention are those which have ring and ball softening points from about 150° F. to about 325° F., the resins of softening points higher than the latter value being undesirably difficult to solubilize in the hot melt compositions for which they are intended. We find resins of softening points from 175 to 270° F. to be desirable and prefer those of softening points from 200 to 270° F.

The dimethyl alpha-methyl styrene resins of our invention can be conveniently produced by polymerization of dimethyl alpha-methyl styrene in inert organic solvents. Such polymerization can be carried out with $BF_3$, $BF_3$ complexes, aluminum chloride and similar Friedel-Crafts type acidic catalysts. The polymerization reactions are desirably carried out in inert organic solvents such as cumene, heptanes, hexanes, toluene, xylene and like materials liquid under the conditions of polymerization. These solvents facilitate control of the reaction temperatures and rates in the polymerization. The polymerizations can be performed in both batch and continuous operations, though we prefer the continuous process because of its greater convenience.

The hot melt compositions of our invention can be conveniently made by combining a poly-dimethyl alpha-methyl styrene resin with a paraffin wax and an ethylene-vinyl acetate copolymer. The amount of any one of the three components in the mixture can range from as little as 20 percent by weight of the mixture to as much as 80 percent by weight of the total mixture. In hot melt adhesives, where the cost of material is not as significant as in hot melt coatings, the paraffin wax can be omitted.

The paraffin waxes suitable for the practice of our invention are those known to the art having a melting point within the range of about 125 to about 200° F. The ethylene-vinyl acetate copolymers suitable in the practice of our invention are those having a mol ratio of ethylene to vinyl acetate within the range of 90:10 to 50:50 and preferably within the range of 80:20 to 60:40, with a Melt Index within the range of 1 to 150 or more desirably from 2 to 30 and preferably from 2 to 5. The individual ingredients may be combined in various proportions to make hot melt compositions and the choice of proportions is selected according to the properties desired. For example, a hot melt composition useful as an adhesive will desirably contain relatively small amounts of petroleum wax as compared to a hot melt composition intended as a paper coating. Generally, the adhesive compositions should contain from about 5 percent or less of petroleum wax to about 60 percent, while the coating compositions may contain from as much as 90 percent or more of wax to as little as 35 percent, all by weight.

As a more specific exemplification of the preparation of a resin of our invention, the following example is presented. A cumene solution of dimethyl alpha-methyl styrene, containing about 20 percent by weight of polymerizable monomer, is coled to a temperature of about −30° F. and fed to the inlet of a tube-type reactor. Gaseous $BF_3$ is metered into the feed as it enters the reactor in an amount of about 0.1 weight percent based on total solution weight. The solvent and catalyst are removed from the reactor effluent stream by distillation and there is recovered a poly-dimethyl alpha-methyl styrene having a softening point in the range 250–255° F. and a weight average molecular weight of about 700.

The preparation of a hot melt formulation of our invention can be performed as follows: Into about 33.3 weight percent of paraffin wax, at a temperature of 300° F., in a two-liter, stainless steel kettle, fitted with an agitator, there is added 33.3 parts by weight of an ethylene-vinyl acetate copolymer (Elvax 260 containing 28 percent vinyl acetate) and about 33.3 parts by weight of a dimethyl alpha-methyl styrene resin having a ring and ball softening point of about 250° F. This mixture is held at 300° F., with agitation, until the components appear to be dissolved and a clear and smooth blend is obtained. This blend is suitable for use as a hot melt coating or adhesive, as set forth below. Mixing can be performed conveniently at temperatures within the range of just high enough to melt all the components up to the decomposition temperature of any component. The usual anti-oxidants known to this art, such as butylated hydroxy toluene, may be added in small amounts sufficient for stabilization against oxidative degradation.

A 7-inch wide, 23 lb./3000 sq. ft. glassine paper is coated at a weight of about 7 to 8 lbs./3000 sq. ft. on a Dusenbury roll coater, with the melt tank held about 325° F. and the pickup roll and doctor blade held about 310–315° F. This coated paper has satisfactory pick point, block point, gloss and seal strength for commercial applications.

When the above hot melt formulation was tested as an adhesive for wood, the wood fibers parted before the adhesive bond.

Having thus described our invention, what we claim is:

1. A composition comprising, by weight, 0–90 percent of paraffin wax, 20–80 percent of an ethylene-vinyl acetate copolymer having a vinyl acetate content within the range of 10–50 mol percent, and 20–80 percent of a poly-dimethyl alpha-methyl styrene resin having a ball and ring softening point within the range of 150° F. to 325° F.

2. The composition of claim 1 comprising 20–80 percent of paraffin wax, 20–80 percent of an ethylene-vinyl acetate copolymer having a vinyl acetate content within the range of 20–40 mol percent, and a melt index within the range of 2–30 and 20–80 percent of a poly-dimethyl alpha-methyl styrene resin having a ball and ring softening point within the range of 175–270° F.

3. The composition of claim 2 comprising about 33 percent of paraffin wax, about 33 percent of ethylene-vinyl acetate copolymer and about 33 percent of poly-dimethyl alpha-methyl styrene resin.

4. A paper coated with the composition of claim 1.

References Cited

UNITED STATES PATENTS

| | | | |
|---|---|---|---|
| 3,306,882 | 2/1967 | Pullen | 260—28.5 |
| 3,245,931 | 4/1966 | Matthew | 260—28.5 |
| 3,294,722 | 12/1966 | Apikos | 260—28.5 |

OTHER REFERENCES

Chemical Abstracts (C.A.), vol. 59 (1963), p. 1761d, vol 61 (1964), p. 4493.

JULIUS FROME, *Primary Examiner.*